(12) United States Patent
Brunet et al.

(10) Patent No.: US 6,662,176 B2
(45) Date of Patent: Dec. 9, 2003

(54) DATABASE INDEXING AND ROLLING STORAGE METHOD FOR TIME-STAMPED NORMALIZED EVENT DATA

(75) Inventors: Xavier Brunet, Sunnyvale, CA (US); N. Lee Rhodes, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 428 days.

(21) Appl. No.: 09/851,067

(22) Filed: May 7, 2001

(65) Prior Publication Data

US 2002/0173911 A1 Nov. 21, 2002

(51) Int. Cl.[7] ............................................... G06F 7/00
(52) U.S. Cl. ..................... 707/2; 707/1; 707/3; 707/102
(58) Field of Search ............................ 707/102, 1–5, 707/6, 104.1, 200; 709/203, 205; 705/1, 30, 7, 11; 715/500.1, 512

(56) References Cited

U.S. PATENT DOCUMENTS

| | | | | |
|---|---|---|---|---|
| 5,627,936 A | * | 5/1997 | Prasad et al. ................ | 386/96 |
| 5,835,667 A | * | 11/1998 | Wactlar et al. ............... | 386/96 |
| 6,075,576 A | * | 6/2000 | Tan et al. ................ | 348/425.4 |
| 6,230,166 B1 | * | 5/2001 | Velamuri et al. ............ | 707/206 |
| 6,236,661 B1 | * | 5/2001 | Ballard ....................... | 370/410 |
| 6,260,011 B1 | * | 7/2001 | Heckerman et al. ........ | 704/235 |
| 6,282,209 B1 | * | 8/2001 | Kataoka et al. ............. | 370/498 |
| 6,345,252 B1 | * | 2/2002 | Beigi et al. ................. | 704/272 |
| 6,377,995 B2 | * | 4/2002 | Agraharam et al. ........ | 709/231 |
| 6,477,546 B1 | * | 11/2002 | Velamuri et al. ........... | 707/202 |
| 6,493,409 B1 | * | 12/2002 | Lin et al. .................... | 375/375 |
| 6,598,049 B1 | * | 7/2003 | Moriyama ................... | 707/100 |

FOREIGN PATENT DOCUMENTS

| | | |
|---|---|---|
| GB | 2 331 384 | 5/1999 |
| JP | 2001-34620 | 2/2001 |

* cited by examiner

Primary Examiner—Greta Robinson
Assistant Examiner—Miranda Le

(57) ABSTRACT

A database indexing and rolling storage method for normalized event data. Indexing of the normalized event database meets the goals of a manageable storage database and fast accessibility. A log reference step is not required to locate information in the database because the indexing of the invention utilizes the time-stamp information in assigning the location for storage. There accordingly is no need for a separate look-up to associate a time stamped set of information, i.e., a table in a normalized event data database, because the indexing provides an unambiguous reference to a reusable storage location. Because the time-stamped indexing permits re-use of preplanned storage locations, the historical limits of the normalized event data may easily roll over. In other words, elimination of an oldest time period table of data while updating a new table of data is easily accounted for in the indexed database and storage method of the invention.

8 Claims, 2 Drawing Sheets

DATABASE INDEXING AND ROLLING STORAGE METHOD FOR TIME-STAMPED NORMALIZED EVENT DATA

FIELD OF THE INVENTION

The present invention concerns time-stamped data characterizing data flows.

BACKGROUND OF THE INVENTION

Internet and wireless data flows need intelligent monitoring to facilitate a wide range of commercial interests. Software applications are used to monitor devices and other applications to generate metering information concerning data flows. Client billing, for example, may be aided by the monitoring of a client's dataflow in a wireless network such as a cell phone service. Wired networks might also benefit from an ability to monitor dataflow. In an Internet service environment, Internet service providers (ISP's), for example, can have a corresponding benefit from monitoring router traffic.

For these and other reasons, software such as the Hewlett Packard Internet Usage Manager™ has been developed. The basic function of an application such as the Hewlett Packard Internet Usage Manager™ is to collect time-stamped data for logs, statistics and diagnostics, performance analysis, planning, billing and other intelligent and administrative uses of the time-stamped data.

Various devices and/or software applications resident in devices generate time-stamped data. This data characterizes normalized metered events. The data includes a time stamp and some additional data. Using the example of a session server that controls ISP client connections to the Internet, the session server with monitoring software might generate normalized event data including a time stamp, an authentication of the client-subscriber, and data relating to the duration of connection. In a similar fashion, a proxy server acting as a client interface and firewall and including monitoring software might generate normalized event data including a time stamp, a server web page address and the Internet Protocol address (IP) of the client. In the case of a router with monitoring software, the router might generate normalized event data including a time stamp, an IP address of a sender/server, the IP address of the client, and a number of packets exchanged. In each case, the generated data is likely used to support a wide range of administrative services.

Metering and billing represent important administrative services requiring the normalized event data. The time-stamped normalized event data can be used to monitor data traffic levels. It can be used to check quality of service levels. It provides information to be plugged into other software and systems, e.g., inputs to billing systems. Generally, the conventional uses of the normalized event data have been restricted by its limited collection time duration. The conventional data flow monitoring applications, including the Hewlett Packard Internet Usage Manager™, provide temporary databases of the time-stamped normalized event data from which the data is directed into separate applications, such as accounting applications. In an increasingly competitive data services environment, e.g., wireless data communication services and e-services environments, historical normalized event data to which sophisticated statistical analysis could be applied would be a boon as a provider sought to price its service competitively and profitably. Apart from pricing, the historical normalized event data would permit other forms of important statistical modeling to plan services, capacities, and other critical management activities.

SUMMARY OF THE INVENTION

The invention is a database indexing and rolling storage method for time-stamped normalized event data. Indexing of the normalized event database meets the goals of having a manageable storage database and enabling fast accessibility. A log reference step is not required to locate information in the database because the indexing of the invention utilizes the time-stamp information in assigning the location for storage. There accordingly is no need for a separate look-up operation to associate a time-stamped set of information, i.e., a table in a normalized event data database, because the indexing provides an unambiguous reference to a reusable storage location. Because the time-stamped indexing permits re-use of preplanned storage locations, the historical limits of the normalized event data may easily roll over. In other words, elimination of an oldest time period table of data while updating a new table of data is easily accounted for in the database indexing and rolling storage method of the present invention.

DETAILED DESCRIPTION OF THE PREFERRED EMBODIMENTS

The invention provides a database indexing and rolling storage method to manageably and efficiently collect normalized event data concerning data flows. The stored data is indexed to permit rapid retrieval, manageable storage demands and ready updating. A wide range of advantageous statistical analyses of the historical normalized event data indexed and stored through the invention will be enabled. The potential modeling of historical normalized event data offers the opportunity for intelligent analysis of data flows for competitive advantages ranging from pricing and client profiling to planning of equipment usage and needs.

An exemplary embodiment is presented herein to illustrate the invention. The exemplary embodiment provides preferred time quantities for the duration of the rolling database indexed in the exemplary embodiment. While useful in demonstrating the advantages of the invention, the particular assignments for the following defined variables in no way limit the invention. Instead, the broader definitions of the variables as now defined are set forth as the sole limiting factors of the variables used in aspects of the present invention:

$H$—A variable assigned to the retention duration of the rolling database of normalized event data;

$P$—A variable assigned to a the corresponding time duration of a chunk of data, i.e., a discrete table (data base data entry), stored in the rolling database of normalized event data;

$T$—The time stamp, measured in a total duration from a fixed point in time, assigned to a particular table of data $P$; and Offset—A fixed value or a periodic function with a period equal to $H$ yielding a value to offset an index calculation in a desired manner.

H, P and T must have common units, e.g., seconds or minutes, while Offset is a unitless quantity or function. In the exemplary embodiment, as an aid to illustration of the invention, a normalized event database might have a value H of 32 days and a value P of 5 minutes. This then corresponds to a database having 9216 data tables to be indexed. By definition, H will always be larger than P. However, particular applications may benefit from different values of H and P. It is preferred that software embodying the invention permit some modification of H and P. Thus, a user of software embodying the invention might alter the periods of database retention and data table/chunk duration to suit particular statistical or collection needs. The selection might be part of a software set-up installation, for example. It might also be changed by a software administrator or, for example, change in response to the demands of another software application that takes data from a normalized event database stored and indexed according to the invention.

Figure 1:
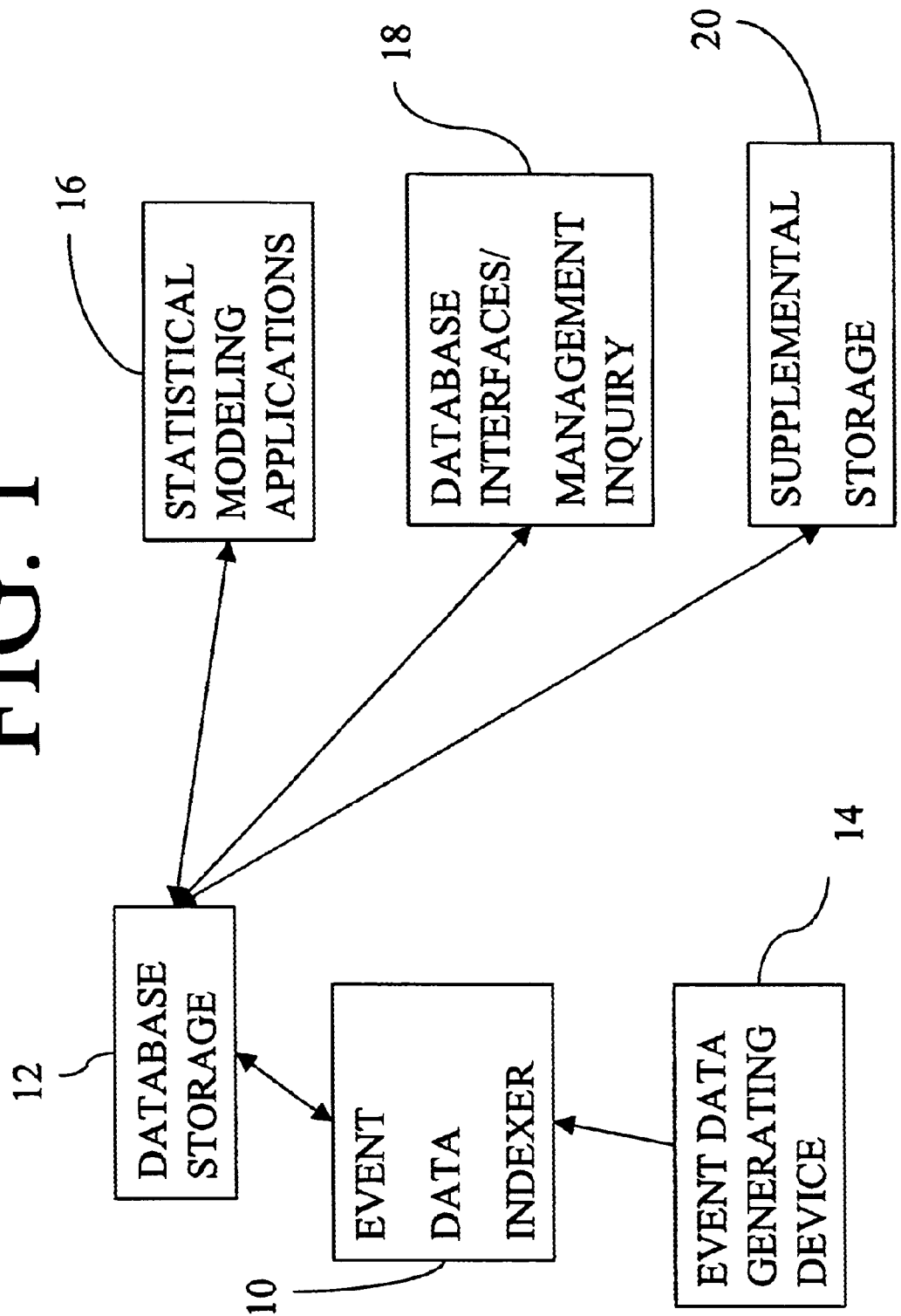
FIG. 1 illustrates application of the indexing and storing method of the invention in an environment for the collection and database storage of normalized event data.

Referring now to FIG. 1, an environment is shown for implementation of the invention. The invention is realized in a normalized event data indexer 10 and associated stored database 12. The indexer 10 collects information from a normalized event data-generating device 14. Such a device, as used herein, includes software applications. The normalized event data-generating device 14 generates time-stamped data and sends the data to the indexer 10. The normalized event data therefore includes a time stamp assigned to a chunk of data and data concerning a data flow, such as the example types of normalized event data generated by routers, session servers and proxy servers discussed in the background of the instant application. The indexer 10 indexes data for storage in the database such that a quantity of historical normalized event data is efficiently stored in the database 12. As an example, the database 12 may include a rolling retention time H of 32 days of timed event data chunks of 5 minutes each, resulting in a database including 9216 data tables of timed event data. Each addition of a 5 minute chunk of data as a new data table implies a re-use of a table index value associated with a previously stored data chunk P now falling outside of the retention period H. The database 12 may then be used by other applications, such as the exemplary statistical analysis program 16, a management interface program 18, or a supplementary long-term storage unit 20.

The usefulness of the database 12 is necessarily linked to the ability of the indexer 10 to make the database tables rapidly retrievable. Storage demands should also be manageable. In other words, memory demands should be easily allocated and should admit of a rapidly retrievable physical storage arrangement. Thus, for example, the indexing and rolling storage preferably produces an unfragmented set of storage locations where a disk drive-type storage unit is used for the database storage.

According to the indexing and rolling storage method of the present invention, the time stamp of the normalized event data stored in each database table indexes each data table in the database 12. By associating the index of a database entry with the time stamp of the data in the table, then retrieval may be conducted by the index. Assigning predetermined memory locations to particular index references avoids the need to create and refer to a location log when storing and retrieving data.

Figure 2:
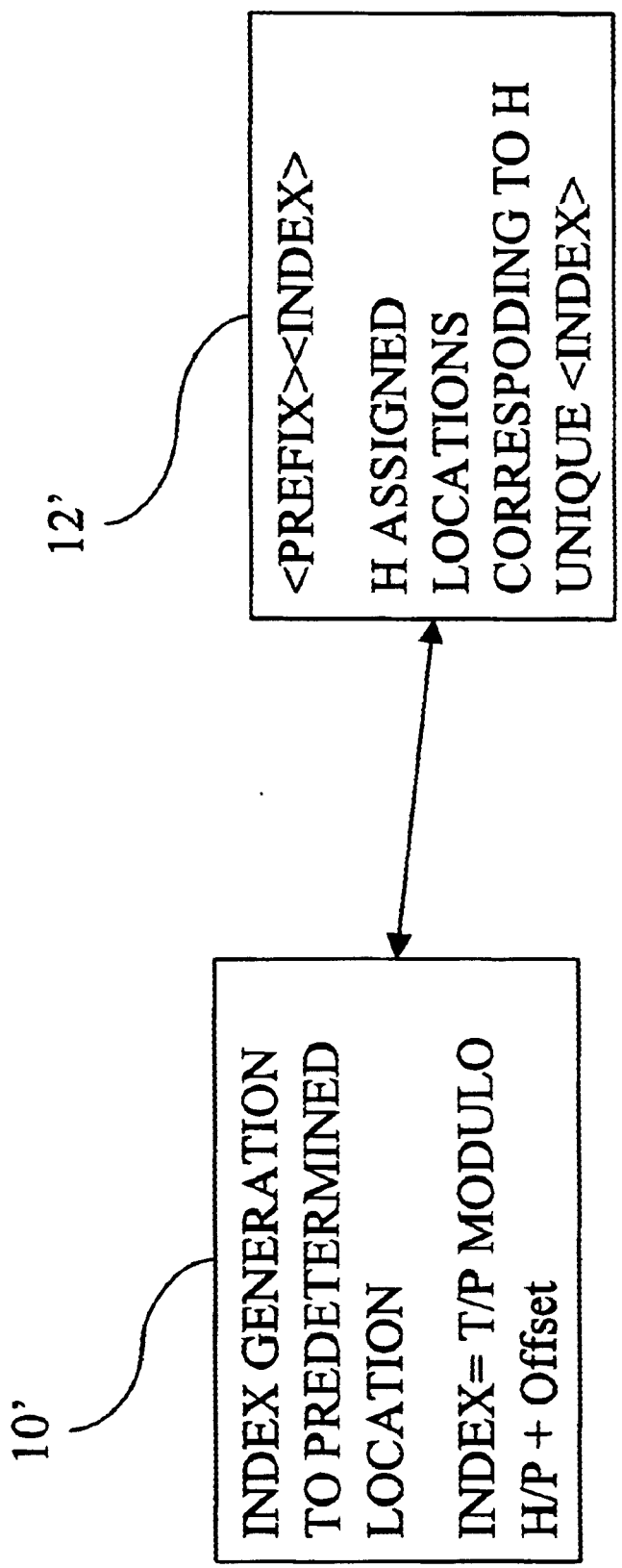
FIG. 2 illustrates time stamp indexing conducted by a preferred embodiment normalized event data indexer and database of the invention in FIG. 1.

More particularly, referring to FIG. 2, a newly arrived chunk of data is indexed by the indexer according to T/P modulo H/P+Offset, where T is the time stamp, H is the database retention time, and P is the duration of a data table/data chunk. In the preferred embodiment, Offset is 1, such that the index values range from 1 to H/P. Offset may be another fixed value including zero or even a function to produce a value. The database 12 has tables stored according to the form<prefix><index>, with the prefix being an arbitrary alphanumeric assigned name and the index being generated based upon the time stamp T. With an Offset equal to 1, the database 12 has index numbers from 1 to H/P. Other numeric assignments can be achieved by a different desired value or function of Offset. The storage locations for database entries may be easily predicted and allocated in a fashion permitting rapid retrieval. Each index number must correspond to a predetermined memory location. This allows rapid retrieval of a particular table in the database or any number of tables according to a particular time stamp, range of time stamps, or group of time stamps. A particular table having a time stamp T1 is retrieved by a memory location in the database located by T1/P modulo H/P+Offset. The values of H and P comprises selectable values that may be altered to suit predetermined uses of the invention. For example, the values may be altered to facilitate a particular statistical analysis or correspond to available memory to store a generated database in another application.

The database storage according to the invention provides a rolling updateable database. An oldest entry is automatically deleted in favor of a newest entry as a function of the modulo operator by the recomputed index. The only requirement for the indexing to function properly is that H, P, and T be in the same format, e.g., seconds. As an example, some conventional software applications generate time stamps measured in seconds from a certain date and time. The time stamp is simply the total number of seconds from that certain date and time. In that case, H and P must also be in seconds. Thus, in the preferred exemplary embodiment, H is (32)× (86,400 seconds), and P is 300 seconds. The indexer 10 then generates unique running index numbers and will, by the modulo operator, re-use index numbers in a periodic fashion according the defined indexing T/P modulo H/P+Offset.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for indexing and storing time-stamped normalized event data in a database, the method comprising steps of:

allocating an area of database storage sufficient to retain an amount of normalized event data over a predetermined retention time H;

dividing the area of database storage into H/P number of unique storage locations, each unique storage location being addressable by a unique index number, where P corresponds to a duration of a chunk of data;

collecting time-stamped normalized event data in P-duration chunks, each P-duration chunk having a time stamp T associated therewith and indicating a total time measured from a fixed point in time;

assigning one of the unique index numbers to each of the P-duration chunks collected in said step of collecting according to index number=T/P modulo H/P+Offset, where Offset is one of a constant value or a periodic function of period H; and storing each P-duration chunk of data in a database in said area of database storage according to the index number assigned in said step of assigning.

2. The method according to claim 1, wherein H and P comprise selectable quantities and said steps of allocating are conducted after selection of H and P.

3. The method according to claim 1, wherein said Offset is equal to 1.

4. The method according to claim 1, further comprising a step of permitting access to said database by a software application according to said unique index numbers.

5. The method according to claim 4, wherein said software application comprises statistical analysis software.

6. The method according to claim 5, wherein said software application comprises management inquiry software.

7. The method according to claim 5, wherein said software comprises supplemental storage software.

8. A computer program product comprising a computer usable medium having computer readable program code embodied in the medium that when executed causes a computer to:

collect normalized event data in fixed P-duration chunks, each chunk of data including a time stamp T indicating a total time measured from a fixed point in time;

assign to each P-duration chunk of data collected in said code to collect, from a collection of predetermined storage locations at least sufficient to store one of said P-duration chunks and having unique storage locations for a plurality of P-duration chunks for a total retention time H, an index number corresponding to one of said unique storage locations wherein the time stamp is used to generate the index number according to index number=T/P modulo H/P+Offset, wherein Offset is one of a constant value or periodic function of period H;

store each chunk of data collected in said code to collect according to the index number assigned in said code to assign.

* * * * *